2,735,853
ASYMMETRICAL INDIGOID DYESTUFFS

Jakob Mueller, Muenchenstein, Switzerland, assignor to Ciba Limited, Basel, Switzerland, a Swiss firm No Drawing. Application August 18, 1952,
Serial No. 305,085

Claims priority, application Switzerland August 23, 1951

9 Claims. (Cl. 260—332)

This invention provides new asymmetrical indigoid vat dyestuffs which are derived from a 5-alkoxy-6-halogen-3-oxythionaphthene, more especially the oxythionaphthene of the formula

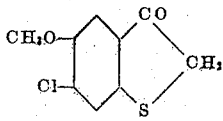

or from a derivative of such an oxythionaphthene reactive in the 2-position.

These new dyestuffs are made in accordance with the invention by condensing a 5-alkoxy-6-halogen-3-oxythionaphthene or a derivative thereof reactive in the 2-position with a component suitable for the production of indigoid vat dyestuffs.

The said 5-alkoxy-6-halogen-3-oxythionaphthenes preferably contain an alkoxy group of the lower series, especially an alkoxy group containing up to 4 carbon atoms, such as a butyloxy- or propyloxy- group or with advantage an ethoxy- or methoxy-group.

The 5-alkoxy-6-halogen-3-oxythionaphthenes used as starting materials can be made by methods in themselves known, for example, by the xanthate method from 4-alkoxy-3-halogen-1-aminobenzenes, for example, from 4-ethoxy- or 4-methoxy-3-bromo-1-aminobenzene or 4-ethoxy-3-chloro-1-aminobenzene, and especially 4-methoxy-3-chloro-1-aminobenzene, by way of the corresponding thioglycollic acids. The ring closure of the thioglycollic acids to form the oxythionaphthenes can be brought about with the aid of phosphorus trichloride to form the acid chloride followed by treatment with aluminium chloride, advantageously at a low temperature of about 0° to 5° C. (in order to avoid splitting off an alkoxy group). However, ring closure may also be brought about in the desired manner by the use of chlorosulfonic acid as condensing agent, especially if the temperature is below 0° C. so as to avoid to a considerable extent the formation of the corresponding symmetrical dyestuff.

As components suitable for the production of indigoid dyestuffs, which components must, of course, be different from the oxythionaphthenes used in order to obtain asymmetrical dyestuffs, there come into consideration, for example, other oxythionaphthenes or their reactive derivatives, such as their anils, especially the dimethylamino-anils. As examples there may be mentioned 6-chloro-3-oxythionaphthene, 4:5-benzo-3-oxythionaphthene, 5:6-benzo-7-chloro-3-oxythionaphthene, 4-methyl-6-chloro-3-oxythionaphthene, 6-methoxy- or 6-ethoxy-3-oxythionaphthene, 5-methyl-6-chloro-3-oxy-thionaphthene and 4:7-dimethyl-5-chloro-3-oxythionaphthene.

Isatins and the isatin chlorides obtainable therefrom in known manner can also be used for the condensation, for example, 5:7-dibrom-isatin and 4-methyl-5-chloro-7-methoxy-isatin and especially their chlorides.

The condensation may be carried out in known manner by bringing the components together in an inert solvent, such as benzene or a chlorinated benzene, especially monochlorobenzene, for example, at a slightly raised temperature. In choosing the components it is necessary, as is known to take care that they are in different states of oxidation, for example, one of the components may be in the form of the oxythionaphthene and the other in the form of the anil, isatin or isatin chloride.

The dyestuffs so obtained can be used in known manner for dyeing a very wide variety of materials such as wool, silk, superpolyamide fibers, cellulose acetate silk, and especially fibers of vegetable character such as cotton, linen and staple fibers of regenerated cellulose. However, they are especially suitable for printing by the usual methods, for example, by the so-called potash printing process. The dyestuffs yield tints of predominantly covered shades, which are distinguished by good properties of fastness, especially by good fastness to light.

The dyestuffs can be converted in known manner into leuco-ester derivatives, especially sulfuric acid leucoesters and can be used in dyeing and printing by the methods usual for this class of dyestuffs.

The following examples illustrate the invention, the parts and percentages being by weight:

Example 1

28.5 parts of 5-methoxy-6-chloro-3-oxy-thionaphthene are dissolved in 1000 parts of chlorobenzene and condensed with 43.6 parts of the 2-(para-dimethylamino)-anil of 4:5-benzo-3-oxy-thionaphthene for a few hours at 80–90° C. The precipitated dyestuff, which is obtained in good yield is filtered off, washed with chlorobenzene and alcohol and dried. The dyestuff is of the formula

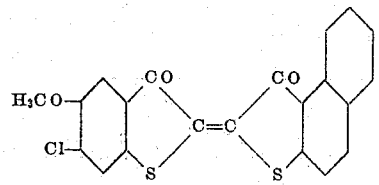

and is a brown-violet powder giving a blue-violet coloration in concentrated sulfuric acid. The dyestuff yields by the usual potash printing process dark brown tints of very good fastness to light.

The same dyestuff is obtained by condensing 4:5-benzo-3-oxythionaphthene with the 2-(para-dimethylamino)-anil of 5-methoxy-6-chloro-3-oxythionaphthene.

Example 2

40.8 parts of the 2-(para-dimethylamino)-anil of 6-chloro-3-oxythionaphthene are introduced into a solution of 27.7 parts of 5-methoxy-6-chloro-3-oxy-thionaphthene in 1000 parts of chlorobenzene, and the condensation is carried on for a few hours at 80–90° C. The resulting dyestuff of the formula

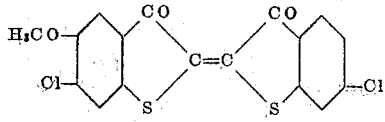

is filtered off and worked up in the usual manner. There is obtained a red-violet powder, which dissolves in concentrated sulfuric acid with a green coloration. There are obtained on cotton by the usual printing processes violet-red tints of excellent fastness to light.

Example 3

31 parts of 5-methoxy-6-chloro-3-oxythionaphthene are dissolved in 1400 parts of chlorobenzene, 52.9 parts of the 2-(para-dimethylamino)-anil of 5:6-benzo-7-chloro-3-oxythionaphthene, and the condensation is carried on for a few hours at 80–90° C. The resulting dyestuff of the formula

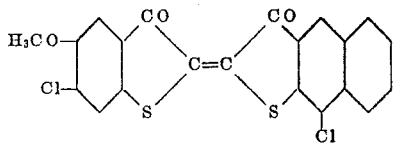

is worked up in the usual manner. The dyestuff is obtained in the form of a black-violet powder and yields a green coloration in concentrated sulfuric acid. It yields on cotton by the usual printing processes dark blue tints of very good fastness to light.

In an analogous manner the dyestuffs given in the following table are obtained from 5-methoxy-6-chloro-3-oxythionaphthene:

| Condensed with the 2-(para-dimethylamino)-anil of: | Color of the dyestuff | Coloration in concentrated sulfuric acid | Tint of dyeing on cotton |
|---|---|---|---|
| 4 - methyl - 6 - chloro - oxythionaphthene. | blue-red | green | bordeaux. |
| 6 - methoxy - 3 - oxythionaphthene. | bordeaux | violet | red-brown. |
| 6-ethoxy-3-oxythionaphthene. | violet red | do | bordeaux. |
| 5 - methyl - 6 - chloro - 3 - oxythionaphthene. | red-violet | green | red-violet. |
| 4:7 - dimethyl - 5 - chloro-3-oxythionaphthene. | do | do | Do. |
| 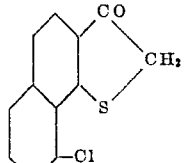 | violet | violet-red | grey. |
| condensed with 4-methyl-5-chloro - 7 - methoxy - isatin chloride. | blue-violet | green | blue. |

*Example 4*

56 parts of 5:7-dibromisatin are converted by heating with 45 parts of phosphorus pentachloride in 800 parts of chlorobenzene into isatin chloride. Into the solution are stirred 38 parts of 5-methoxy-6-chloro-3-oxythionaphthene dissolved in 1300 parts of chlorobenzene. The dyestuff, which is immediately precipitated, is filtered off after about 1 hour and worked up in the usual manner. There is obtained a violet powder which gives a blue-green coloration in concentrated sulfuric acid. The dyestuff yields on cotton by the usual printing processes dark blue tints of good fastness to light.

*Example 5*

22.8 parts of 5-ethoxy-6-chloro-3-oxythionaphthene are condensed with 33.2 parts of the 2-(para-dimethylamino)-anil of 4:5-benzo-3-oxythionaphthene in 800 parts of chlorobenzene for a few hours at 80° C. The resulting dyestuffs of the formula

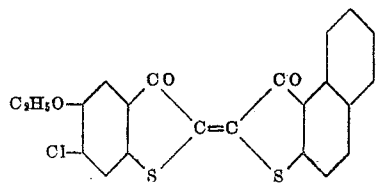

is a red-brown powder and yields prints on cotton by the potash printing process red-brown tints of a somewhat more reddish shade than the corresponding dyestuff of Example 1.

By condensing in an analogous manner 25.9 parts of 5-methoxy-6-bromo-3-oxythionaphthene with 33.2 parts of the 2-(para-dimethylamino)-anil of 4:5-benzo-3-oxythionaphthene in 800 parts of chlorobenzene the dyestuff of the formula

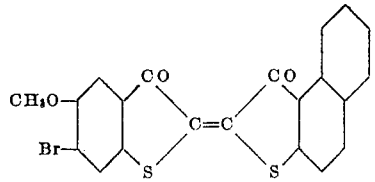

is obtained. It is a brown-red powder which yields red-brown tints on cotton when applied by printing processes.

In the same manner there is obtained from 27.3 parts of 5-ethoxy-6-bromo-3-oxythionaphthene and 33.2 parts of the 2-(para-dimethylamino)-anil of 4:5-benzo-3-oxythionaphthene in 900 parts of chlorobenzene by the usual method of condensation, the dyestuff of the formula

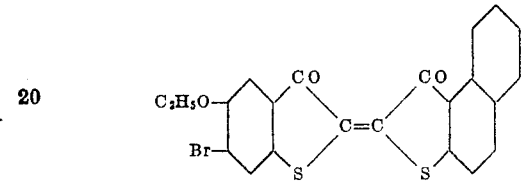

in the form of a brown powder, which yields brown tints on cotton by the usual printing processes, which tints are of a somewhat more yellowish shade than those obtained with the dyestuff of Example 1.

The 5-alkoxy-6-halogen-3-oxythionaphthenes used in the foregoing examples can be prepared as follows:

77.6 parts of 3-chloro-4-methoxy-1-aminobenzene hydrochloride are diazotized in 800 parts of water, 200 parts of ice and 60 parts of hydrochloric acid with a solution of 28 parts of sodium nitrite in 80 parts of water. The diazo solution so obtained is run at about 70° C., while stirring, into 80 parts of potassium xanthate, 400 parts of water and 100 parts of sodium carbonate. The xanthate ester which separates is isolated and hydrolyzed at 80° C. with 300 parts of alcohol and 100 parts of caustic soda solution of 40° Bé. After the addition of an alkaline solution of 40 parts of chloracetic acid in 600 parts of water, the condensation is brought about and the alcohol is simultaneously distilled off. When the condensation is finished, the mixture is dissolved with water, filtered to remove impurities, and the thioglycollic acid is precipitated from the filtrate by means of mineral acid. The resulting 3-chloro-4-methoxybenzene-1-thioglycollic acid of the formula

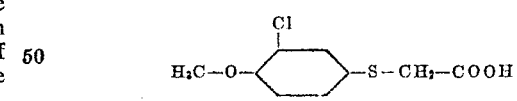

crystallizes from acetic acid in lamellae having the lustre of mother of pearl and melting at 115–116° C.

By using instead of 77.6 parts of 3-chloro-4-methoxy-1-aminobenzene hydrochloride, 83.2 parts of 3-chloro-4-ethoxy-1-aminobenzene hydrochloride or 95.4 parts of 3-bromo-4-methoxy-1-aminobenzene hydrochloride, and diazotizing in 1000 parts of water (instead of 800 parts), there is obtained in the same manner 3-chloro-4-ethoxy-1-thioglycollic acid of the formula

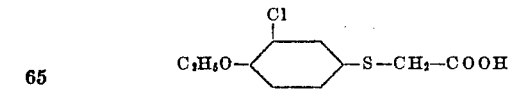

which crystallizes from dilute alcohol in the form of colorless needles melting at 103° C. or 3-bromo-4-methoxy-1-thioglycollic acid of the formula

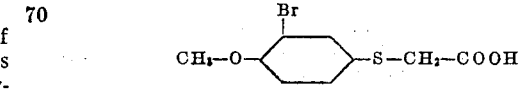

which crystallizes from chloroform in the form of dense crystals melting at 110–111° C.

In the same manner there is obtained from 101 parts of 3-bromo-4-ethoxy-1-aminobenzene hydrochloride (diazotized in 1300 parts of water), 3-bromo-4-ethoxybenzene-1-thioglycollic acid of the formula

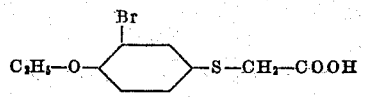

which crystallizes from dilute alcohol in the form of lustrous lamellae melting at 47–48° C.

The aforesaid thioglycollic acids can be converted into the corresponding oxythionaphthenes, for example, as follows:

20 parts of 3-chloro-4-methoxybenzene-1-thioglycollic acid, 30 parts of chlorobenzene and 9 parts of phosphorus trichloride are heated for one hour on a boiling water bath under a reflux condenser. The resulting solution of the acid chloride is decanted from a small amount of phosphorus sludge, and then run at 0–5° C., while stirring into 15 parts of anhydrous aluminum chloride and 70 parts of chlorobenzene. The reaction mixture is then stirred for a few hours at that temperature. The orange colored reaction mass is stirred into 100 parts of ice and 5 parts of hydrochloric acid and then the chlorobenzene is distilled off with steam. After cooling the crude oxythionaphthene is filtered off, dissolved by boiling in dilute caustic soda solution, filtered to remove a small amount of a resinous residue, and the filtrate is precipitated with mineral acid, whereby 5-methoxy-6-chloro-3-oxythionaphthene of the formula

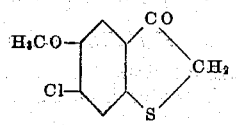

is precipitated in a white flocculent form. From dilute acetic acid there are obtained colorless needles melting at 195° C.

300 parts of chlorosulfonic acid are cooled to —7° C., and 40 parts of 3-chloro-4-methoxy-1-thioglycollic acid are slowly introduced while stirring. When the addition is complete, the mixture is stirred for a few hours at that temperature. The dark red-brown solution is introduced into ice water, whereby 5-methoxy-6-chloro-3-oxythionaphthene is precipitated in a reddish white flocculent form. By dissolving it in dilute caustic soda solution, filtering it off and precipitating with mineral acid, the product can be freed from traces of the symmetrical dyestuff.

50 parts of 3-chloro-4-ethoxybenzene-1-thioglycollic acid are heated with 21 parts of phosphorus trichloride in 75 parts of ortho-dichlorobenzene for one hour under reflux on a boiling water bath. The resulting solution of the acid chloride is decanted to separate it from a small amount of phosphorus sludge, and the solution is run at 0–5° C. into 38 parts of aluminum chloride in 180 parts of ortho-dichlorobenzene. The whole is stirred for a few hours at 0–5° C. The orange colored reaction mass is introduced into 250 parts of ice and 15 parts of hydrochloric acid, and the ortho-dichlorobenzene is distilled off with steam. After cooling, the precipitated oxythionaphthene is filtered off, and, for the purpose of purification, is dissolved in dilute caustic soda solution by boiling, filtered, and the filtrate is acidified with hydrochloric acid. In this manner 5-ethoxy-6-chloro-3-oxythionaphthene of the formula

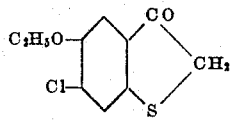

is precipitated in a white flocculent form. By recrystallization from acetic acid it yields fine colorless needles melting at 139° C.

By using, instead of 3-chloro-4-ethoxybenzene-1-thioglycollic acid, the same amount of 3-bromo-4-methoxybenzene-1-thioglycollic acid or 3-bromo-4-ethoxybenzene-1-thioglycollic acid and 19 or 18 parts of phosphorus trichloride, respectively, (instead of 21 parts), there is obtained 5-methoxy-6-bromo-3-oxythionaphthene of the formula

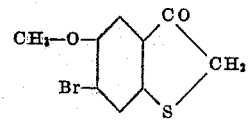

which crystallizes from glacial acetic acid in the form of broad lustrous needles melting at 213–214° C., or 5-ethoxy-6-bromo-3-oxythionaphthene of the formula

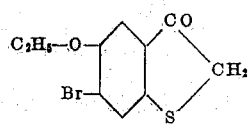

which crystallizes from acetic acid in the form of fine needles melting at 151–152° C.

*Example 6*

30 parts of the dyestuff obtained as described in Example 1 are well moistened with 20 parts of alcohol and 120 parts of water, then mixed with 700 parts of potash thickening, 30 parts of a caustic soda solution of 36° Bé. and 20 parts of hydrosulfite concentrated powder, and heated to 50 to 60° C. After cooling, 80 parts of sodium formaldehyde sulfoxylate are added and ground in a wet color mill. After printing and drying the material, it is steamed for 8 minutes in a Mather-Platt apparatus free from air, rinsed in cold water, then re-oxidized at 40° C., rinsed with 3 parts per liter of perborate and 2 parts of acetic acid of 40 per cent strength, and soaped for 10 minutes at 80–90° C. Finally the material is again rinsed well.

The potash thickening is prepared as follows:

70 parts of wheat starch are well stirred with a mixture of
100 parts of water and
100 parts of glycerine, then mixed with
170 parts of tragacanth 60:1000,
140 parts of British gum. The whole is boiled for ½ hour, and cooled while stirring. Then
170 parts of potassium carbonate, dissolved in
250 parts of water, are added, and the whole is again boiled for a short time and cooled.

1000 parts=1 kilogram.

What is claimed is:

1. An asymmetrical indigoid vat dyestuff of the general formula

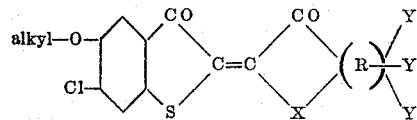

wherein X stands for a member of the group consisting of —NH— and —S—, wherein the "alkyl" radical contains at the most four carbon atoms, and wherein R stands for an aromatic radical containing at the most two rings both of which are six-membered carbon rings, and Y is selected from the group consisting of hydrogen, halogen, alkoxy and alkyl with at the most four carbon atoms.

2. An asymmetrical indigoid vat dyestuff of the general formula

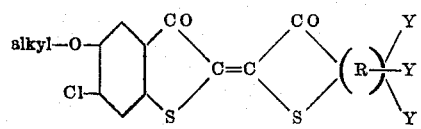

wherein the "alkyl" radical contains at the most four carbon atoms, and wherein R stands for an aromatic radical containing at the most two rings both of which are six-membered carbon rings, and Y is selected from the group consisting of hydrogen, halogen, alkoxy and alkyl with at the most four carbon atoms.

3. An asymmetrical indigoid vat dyestuff of the general formula

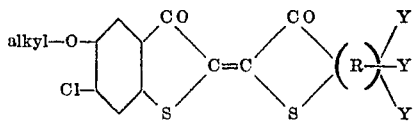

wherein the "alkyl" radical contains at the most four carbon atoms and wherein R stands for a naphthalene radical, and Y is selected from the group consisting of hydrogen, halogen, alkoxy and alkyl with at the most four carbon atoms.

4. An asymmetrical indigoid vat dyestuff of the general formula

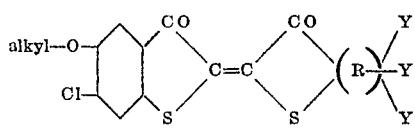

wherein the "alkyl" radical contains at the most four carbon atoms and wherein R stands for a benzene radical, and Y is selected from the group consisting of hydrogen, halogen, alkoxy and alkyl with at the most four carbon atoms.

5. The thioindigoid vat dyestuff of the formula

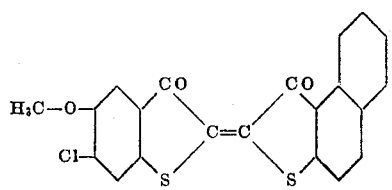

6. The thioindigoid vat dyestuff of the formula

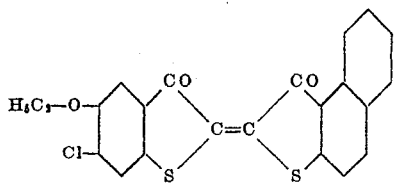

7. The thioindigoid vat dyestuff of the formula

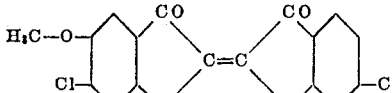

8. The thioindigoid vat dyestuff of the formula

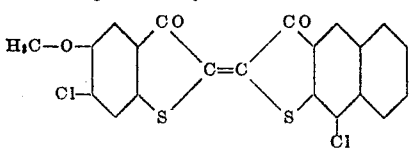

9. The thioindigoid vat dyestuff of the formula

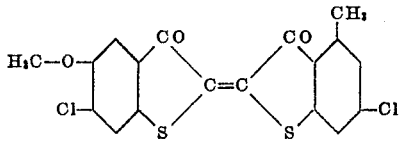

References Cited in the file of this patent
UNITED STATES PATENTS

| | | |
|---|---|---|
| 916,030 | Schmidt et al. | Mar. 23, 1909 |
| 1,790,843 | Schirmacher et al. | Feb. 3, 1931 |
| 1,938,054 | Steiger | Dec. 5, 1933 |
| 2,021,267 | Steiger et al. | Nov. 19, 1935 |

FOREIGN PATENTS

| | | |
|---|---|---|
| 123,685 | Switzerland | Nov. 15, 1926 |
| 219,268 | Germany | Feb. 26, 1910 |

OTHER REFERENCES

Guha: Chem. Abstr. 33:7779 (1939); 39:1539 (1945); 39:4489 (1945); 40:5253 (1946).